United States Patent
Elkan et al.

(10) Patent No.: US 11,593,885 B2
(45) Date of Patent: Feb. 28, 2023

(54) REGULARIZATION-BASED ASSET HEDGING TOOL

(71) Applicant: Goldman Sachs & Co. LLC, New York, NY (US)

(72) Inventors: Charles Peter Elkan, New York, NY (US); Dimitrios Tsementzis, New York, NY (US); Matthew William Turk, New York, NY (US); James Dunworth-Crompton, Brooklyn, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 18 days.

(21) Appl. No.: 17/193,949

(22) Filed: Mar. 5, 2021

(65) Prior Publication Data

US 2021/0279805 A1    Sep. 9, 2021

Related U.S. Application Data

(60) Provisional application No. 62/985,825, filed on Mar. 5, 2020.

(51) Int. Cl.
*G06Q 40/06* (2012.01)
*G06N 5/04* (2006.01)
(Continued)

(52) U.S. Cl.
CPC ............... *G06Q 40/06* (2013.01); *G06N 5/04* (2013.01); *G06N 20/00* (2019.01); *G06F 3/04847* (2013.01)

(58) Field of Classification Search
CPC ..................................................... G06Q 40/06
(Continued)

(56) References Cited

U.S. PATENT DOCUMENTS 11,100,587 B2 * 8/2021 Das .................. G06F 16/248
2006/0010053 A1   1/2006 Farrow
(Continued)

FOREIGN PATENT DOCUMENTS

KR    10-2020-0001189 A    1/2020
WO    WO 2019/171040 A1    9/2019

OTHER PUBLICATIONS

Zou, H. et al., "Regularization and variable selection via the elastic net," Journal of the Royal Statistical Society, Series B (Statistical Methodology), 2005, pp. 301-320, vol. 67, No. 2.
(Continued)

*Primary Examiner* — Lindsay M Maguire
(74) *Attorney, Agent, or Firm* — Fenwick & West LLP

(57) ABSTRACT

A regularization-based (RB) hedging tool identifies a recommended hedging portfolio that track a target asset and provides one or metrics indicating a predicted performance of the hedging portfolio relative to the target asset. The RB hedging tool uses a RB hedging model that is trained on price data from an observation period. Initial hyperparameters for the model are selected using asset price data from a validation period and the performance of the model is evaluated by applying it to asset price data from a backtest period. The end-user is presented with one or more metrics indicating the performance of the model and may modify one or more settings (e.g., hyperparameters) of the model. The model is retrained and reapplied to the backtest period, and the metrics are updated. Thus, end-users may tailor the model to their own particular needs and preferences.

20 Claims, 13 Drawing Sheets

(51) Int. Cl.
*G06N 20/00* (2019.01)
*G06F 3/04847* (2022.01)

(58) Field of Classification Search
USPC .......................................................... 705/36 R
See application file for complete search history.

(56) References Cited

U.S. PATENT DOCUMENTS

| | | | |
|---|---|---|---|
| 2006/0195391 A1* | 8/2006 | Stanelle | G06Q 40/025 |
| | | | 705/38 |
| 2007/0282730 A1 | 12/2007 | Carpenter et al. | |
| 2014/0019380 A1* | 1/2014 | Farrow | G06Q 40/00 |
| | | | 705/36 R |
| 2014/0279693 A1 | 9/2014 | Roy et al. | |
| 2019/0228309 A1* | 7/2019 | Yu | G05B 13/048 |
| 2020/0242697 A1* | 7/2020 | Das | G06Q 10/0635 |
| 2022/0028001 A1* | 1/2022 | Wachell | G06Q 40/025 |

OTHER PUBLICATIONS

PCT International Search Report and Written Opinion, PCT Application No. PCT/IB2021/051883, dated Jun. 10, 2021, nine pages.

* cited by examiner

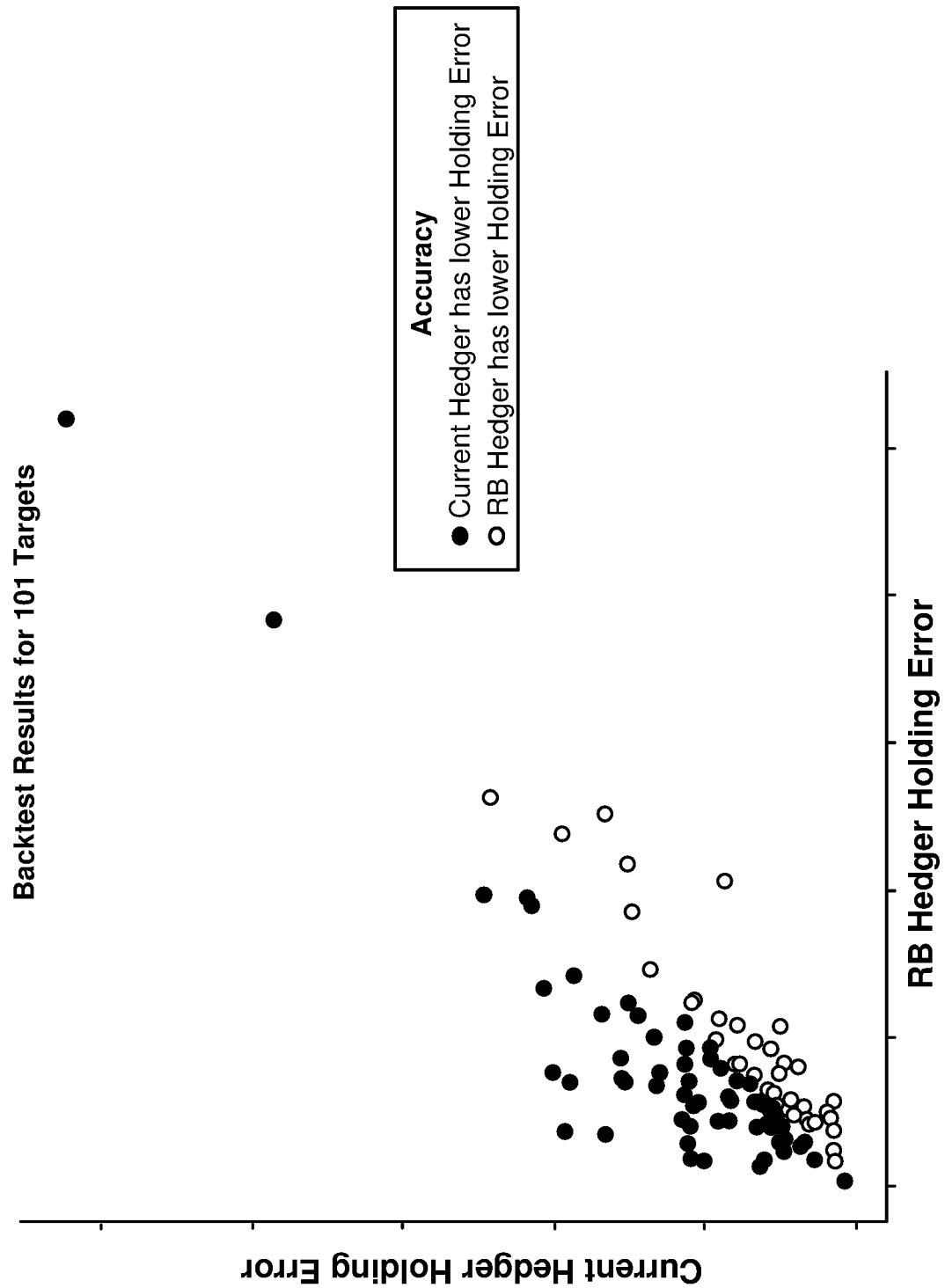

REGULARIZATION-BASED ASSET HEDGING TOOL

CROSS REFERENCE TO RELATED APPLICATIONS

This application claims the benefit of U.S. Provisional Application No. 62/985,825, filed Mar. 5, 2020, entitled regularization-Based Asset Hedging Tool, which is incorporated by reference.

BACKGROUND

1. Technical Field

The subject matter described relates generally to computer-based simulation tools and, in particular, to a regularization-based single asset hedging tool.

2. Background Information

There are a wide range of scenarios in which it is beneficial to hedge a target asset. Computer-based hedging tools automate or semi-automate the process of identifying hedging assets that track the performance of the target asset as closely as possible. Existing tools typically focus on creating a hedging portfolio that matches past performance of the target asset in a training period. This can result in overfitting, where the tool learns to reproduce noise or other unusual features in the training period, limiting the predictive power of such tools in generating effective risk hedging portfolios for the future performance of the target asset. Existing tools also focus on optimal weightings of each asset in the hedging portfolio, requiring frequent rebalancing of the hedging portfolio. Such frequent rebalancing can result in significant transaction costs. Another issue with many existing hedging tools is that they are configured to solve specific, tightly constrained problems. Such tools use a model that is trained according to one or more predetermined limitations (e.g., hyperparameters) and while the end-user can apply the model to different inputs, the limitations used may result in poor model performance for some inputs.

SUMMARY

A regularization-based (RB) hedging tool identifies a recommended hedging portfolio that tracks a target asset and provides one or metrics indicating a predicted performance of the hedging portfolio relative to the target asset. The RB hedging tool (the "RB hedger") uses a RB hedging model that is trained on price data from an observation period. Initial hyperparameters for the model are selected using asset price data from a validation period and the performance of the model is evaluated by applying it to asset price data from a backtest period. The end-user is presented with one or more metrics indicating the performance of the model and may modify one or more settings (e.g., hyperparameters) of the model. The model is retrained and reapplied to the backtest period, and the metrics are updated. Thus, end-users may tailor the model to their own particular needs and preferences.

BRIEF DESCRIPTION OF THE DRAWINGS

FIGS. 7A and 7B compare the holding error and transaction costs for the RB hedging tool and a conventional hedging tool, according to one embodiment.

DETAILED DESCRIPTION

Figure 1:
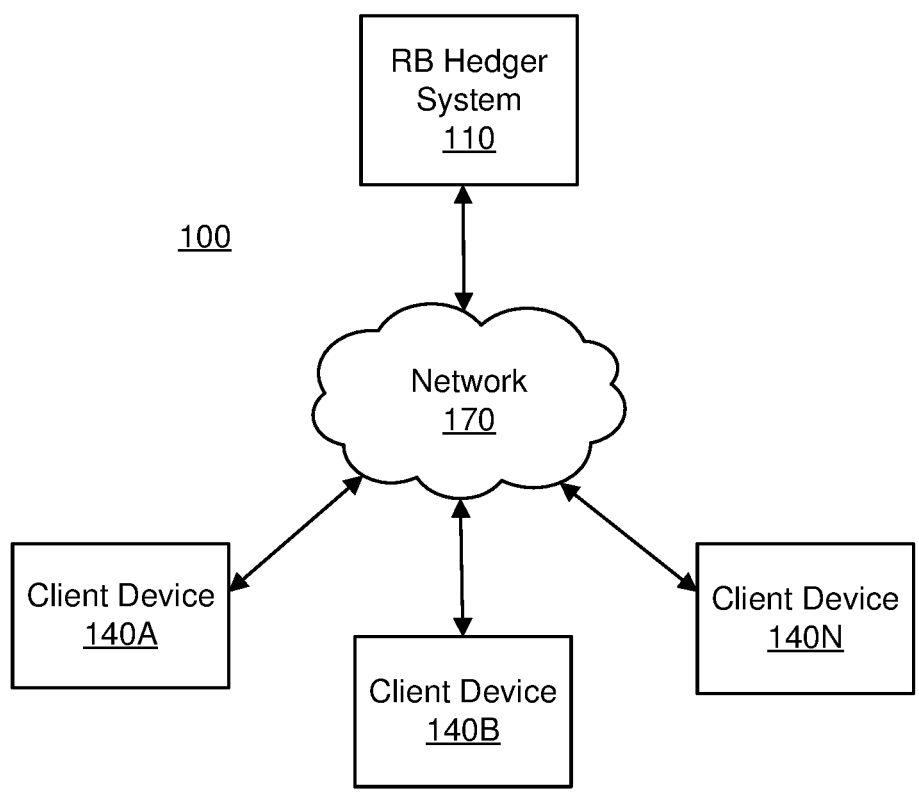
FIG. 1 is a block diagram of a networked computing environment suitable for providing a RB hedging tool, according to one embodiment.

The figures and the following description describe certain embodiments by way of illustration only. It is noted that wherever practicable similar or like reference numbers are used in the figures to indicate similar or like functionality. Where similar elements are referenced by a common numeral followed by a letter, reference to the numeral alone may refer to any such element or combination of elements, depending on the context. One skilled in the art will readily recognize that alternative embodiments of the structures and methods may be employed without departing from the principles described. For convenience, the disclosed RB hedger is described in this disclosure in comparison to a conventional hedging tool referred to as "a conventional hedger."

Overview

The RB hedger is based on a novel improved regularized optimization (e.g., a regression). In one embodiment, the regularized optimization involves solving the following linearly constrained optimization problem:

$$\min_{s} \|U \cdot s - t\|_2 + \lambda_1 \|s\|_1 + \lambda_2 \|s \cdot p\|_2 \qquad (1)$$

where U is a matrix of time series of the returns of assets in the universe we are hedging with, t is the time series of returns of the target asset, s is the number of stocks in the hedging portfolio (that is being solved for), and p is the vector of prices of assets in the universe at the end of the observation period.

More generally, a linear objective function corresponding to equation (1) can be written as:

$$\min_{t, p_1, p_2} t + \lambda_1 p_1 + \lambda_2 p_2 \qquad (2)$$

which can be optimized over linear and quadratic constraints.

An example linear constraint is defined for i=1, . . . , n (where n is the length of the time series) as:

$$\sum_{j=1}^{p}(A_{ij}x_j) - q_i = b_i \quad (3)$$

where A is a matrix of historical prices of a given universe of assets going back n days that includes p assets, $x_j$ is the number of shares in asset j at time i, q represents the optimization problem, and $b_i$ is the target asset's notional at time i.

An example quadratic constraint is defined by the pair of conditions:

$$t^2 \geq \sum_{i=1}^{n} q_i^2 \quad (4)$$

$$p_2^2 \leq \sum_{j=1}^{p} x_j^2 \quad (5)$$

The RB hedger may apply different or additional constraints, such as limiting the amount of any individual asset or class of assets (e.g., assets within a business sector) included in the hedge portfolio. At a high level, the optimization problem for the RB hedger can be expressed by setting the objective function to be minimized (or maximized), defining the allowable ranges for each variable (e.g., whether it is strictly positive or free, etc.), and setting the mathematical constraints (e.g., the linear and quadratic constraints each involving several variables).

Referring again to equation (1), $\lambda_1 \|s\|_1$ is called the lasso penalty and controls how concentrated the resulting hedge is (i.e. how many assets the hedging portfolio will include). The $\lambda_2 \|s \cdot p\|_2$ part of equation (1), a variation of the so-called ridge penalty, controls how diversified the hedge is in terms of the different sizes of the positions in the hedging portfolio. The technical term "ridge" refers to using the squared $\ell_2$-norm $\|-\|_2^2$ for regularization. In contrast, equation (1) uses the unsquared norm, and can thus be thought of as "Euclidean norm" regularization. Thus, it is referred to as ridge-like herein.

The amount of concentration and diversity is controlled by the values of the $\lambda_1$ and $\lambda_2$ hyperparameters. Optimal values for these parameters may be estimated by empirical means. For example, estimates of the optimal parameters may be determined by measuring the holding error for various combinations of values and picking the combination with the best results ("grid search").

Unlike previous methods, the lasso and ridge-like penalties may prevent the hedge from overfitting the past by causing the solution to settle at a compromise between a concentrated and a diversified hedge. Furthermore, in some embodiments, the end user may be able to vary the concentration and diversity hyperparameters at run time and quickly view the resulting variations in the calculated hedging portfolio and its performance relative to the target asset with regard to one or more metrics. Thus, end users may tune the model to their individual needs and preferences substantially in real time without requiring the model provider to update the model.

As a result of these enhancements, the novel RB hedger may provide the following advantages in single asset hedging:

Concentration: This corresponds to focusing a hedge on a reduced number of assets in the portfolio that is constructed. Higher concentration means fewer assets are present in the hedge portfolio.

Diversity: Increasing uniformity in the distribution of weights in the hedge portfolio. Higher diversity means more balance in the distribution of weights for assets in the portfolio.

Reduced transaction costs: Decreasing the cost of trading the positions in the hedge.

Generally, a good single asset performance hedge strikes a balance between concentration (it includes only a few assets that track the performance of the target asset) and diversity (it puts approximately even weights on the selected assets). The RB hedger uses a novel formalization of this idea, in a way that is highly interpretable and customizable, and improves the accuracy of the resulting hedges.

In one embodiment, the RB hedger uses an interface that binds its native programming language to Java® to achieve significant latency improvements over existing hedging tools. This may enable the RB hedger to rapidly refit and optimize the model in a matter of seconds (e.g., in less than one second, less than three second, less than five seconds, etc.) any time arguments are modified by the end user. To achieve such rapid refitting and optimization of the model, the RB hedger makes calls to the interface, which wraps the optimizer's Java® api, in one embodiment. In other embodiments, other language-specific APIs may be used. Using the interface in this way, the underlying task and solution objects may be parallelized "in process" when solving the objective function for each constraint. Furthermore, the hyperparameter search may be more effectively distributed. These improvements provided by the interface may result in a speed increase of up to five times relative to conventional approaches when averaged across various inputs.

Example Systems

FIG. 1 illustrates one embodiment of a networked computing environment 100 suitable for providing a RB hedging tool. In the embodiment shown in FIG. 1, the networked computing environment includes a RB hedger system 110 and a set of client devices 140, all connected via a network 170. In other embodiments, the networked computing environment 100 includes different or additional elements. In addition, the functions may be distributed among the elements in a different manner than described. For example, the RB hedger may be provided by a stand-alone system that performs the functionality of both the RB hedger system 110 and a client device 140.

The RB hedger system 110 includes hardware and software for implementing the RB hedger. In various embodiments, the RB hedger fits a hedge over a user-defined observation period in a way that is more likely to make it more accurate in the future. In particular, it does so by using both an observation period to compute the hedge and a validation period to ensure that the hedge has not overfit to the historical data.

Generally speaking, a simple linear regression will appear more accurate than the RB hedger in the observation period. This is, however, an indication that overfitting may occur. That is, the simple linear regression does not generalize the lower holding error in the observation period to the backtest period. In other words, the model learns the noise of a dataset better than the signal that corresponds to better accuracy in new contexts. In the case of a conventional hedger, since no hyperparameters are used and a different optimization problem is being solved, the model is prone to overfitting the observation/backtest data.

For the RB hedger, the opposite is true: the RB hedger is closer to the target asset in the backtest period rather than the observation period. Overfitting is reduced since the model is able to train, validate, and test based on the use of hyperparameters that introduce bias into the training that reduce the model's tendency to focus on noise in the observation period. This is the mechanism through which the RB Hedger may improve accuracy: it learns to ignore noise during the past (the observation period), thus making it perform better in predicting the future or a simulated future (the backtest period). Various embodiments of the RB hedger system 110 are described in greater detail below, with reference to FIG. 3.

Figure 2:
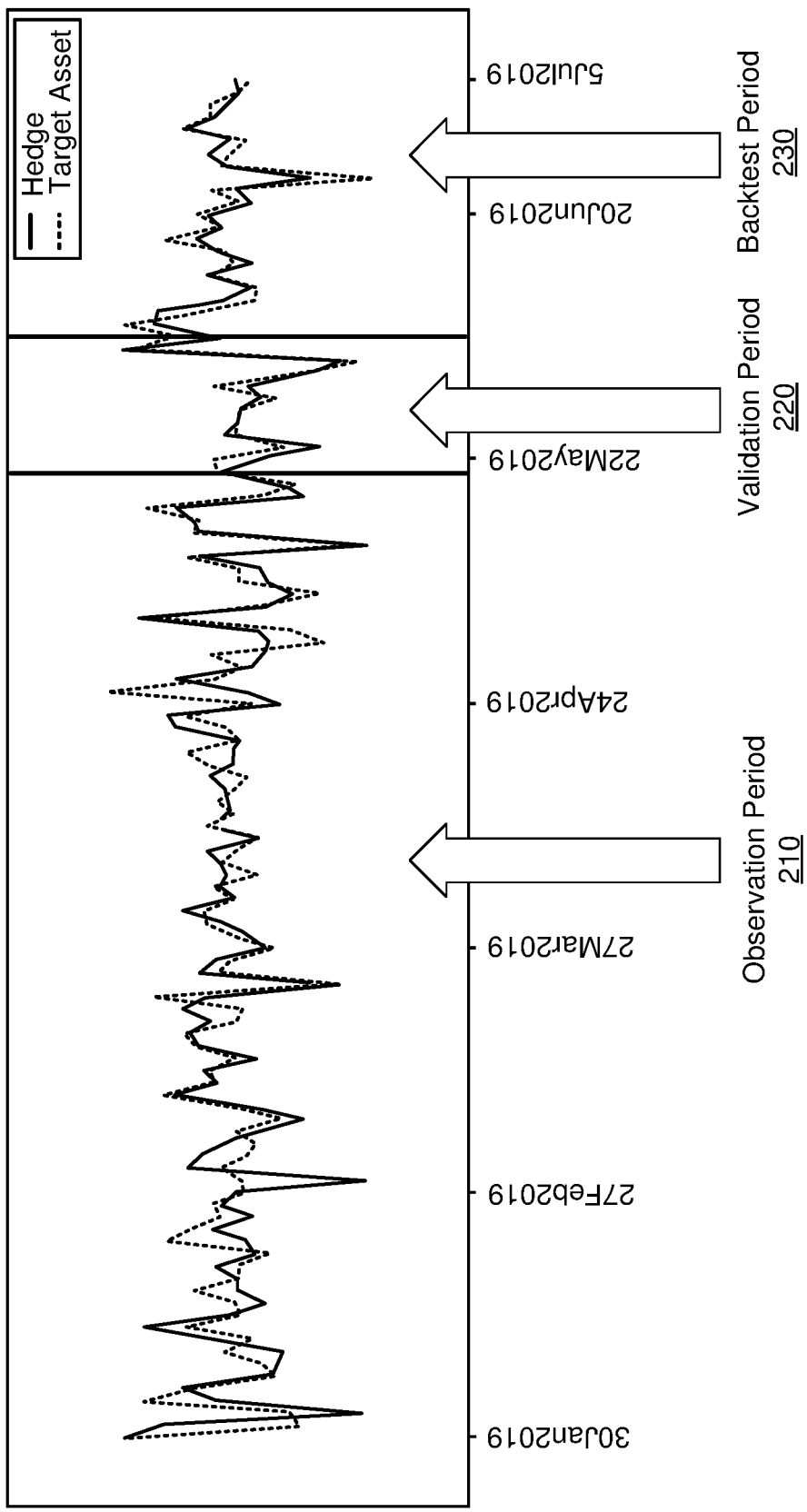
FIG. 2 illustrates performance of a target asset and corresponding hedging portfolio in an observation period, a validation period, and a backtest period, according to one embodiment.

FIG. 2 illustrates the performance of a target asset and corresponding hedging portfolio in an observation period 210, a validation period 220, and a backtest period 230, according to one embodiment. In the example shown, the observation period 210 is four months long, but other lengths of observation period 210 may be used. This is followed by a shorter validation period 220 (e.g., 1 month) and a backtest period 230 (e.g., one month). In FIG. 2, the observation, validation, and backtest periods are shown as occurring in immediate succession. However, there may be a gap between periods.

The observation period 210 is a specified date range of the price curves for the core portfolio and hedge to use in the optimization. The observation period 210 corresponds to the period in which the RB hedger optimization is "fit", where the target number of shares for each asset in the hedge is found, and represents the "training period" (in machine learning terminology). In a conventional hedger, this corresponds to the period in which the optimal weights are found for each constituent in the constructed hedge portfolio. The observation period 210 may be selected by the user. Unlike a conventional hedger, in the case of the RB hedger, a small period of time at the end of the observation period 210 is replaced with the validation period 220.

The validation period 220 is a date range in which the model used by the RB hedger is validated to find optimal (or at least approximately optimal) hyperparameter values, which are used in the optimization problem to increase accuracy in the "simulated out-of-sample period." This period may be automatically constructed by the RB hedger and may depend on the size and dates of the observation period 210 specified by a user. For example, if a conventional hedger would use an observation period 210 of one year from Oct. 18, 2018 to Oct. 18, 2019, the RB hedger may choose its observation period 210 to be Oct. 18, 2018 to Sep. 18, 2019 and its validation period 220 to be Sep. 19, 2019 to Oct. 18, 2019. In other embodiments, different length of validation period 220 may be used.

The backtest period 230 is a date range in which the backtest of the hedge is run. In the case of a conventional hedger, this may be the same as the user-specified observation period 210. A conventional hedger model may fit its linear model over the observation/backtest period and try to minimize the holding error in this period. In the case of the RB hedger, the backtest period 230 is also known as the "simulated out-of-sample" or "test" period in which it is measured how closely the RB hedger is tracking the holding error of a target asset over a date range after the observation/validation periods. This period may be chosen by the user after the observation/validation periods are determined. In one embodiment, the range for this period must be greater than 22 days. In other embodiments, the possible lengths of the backtest period 230 may be different.

Referring again to FIG. 1, the client devices 140 are computing devices capable of receiving user input as well as transmitting and receiving data via the network 170. The client devices 140 can take various forms such as desktop computers, laptop computers, personal digital assistants (PDAs), mobile telephones, smartphones, and other suitable devices. In one embodiment, a client device 140 provides an interface (e.g., a webpage presented in a browser, an app, etc.) with which users may interact with the RB hedger system 110. The user provides parameters and requests generation of a hedging portfolio for a specified asset. The client device 140 may also present information to the user about the resulting hedging portfolio generated by the RB hedger system 110.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 3:
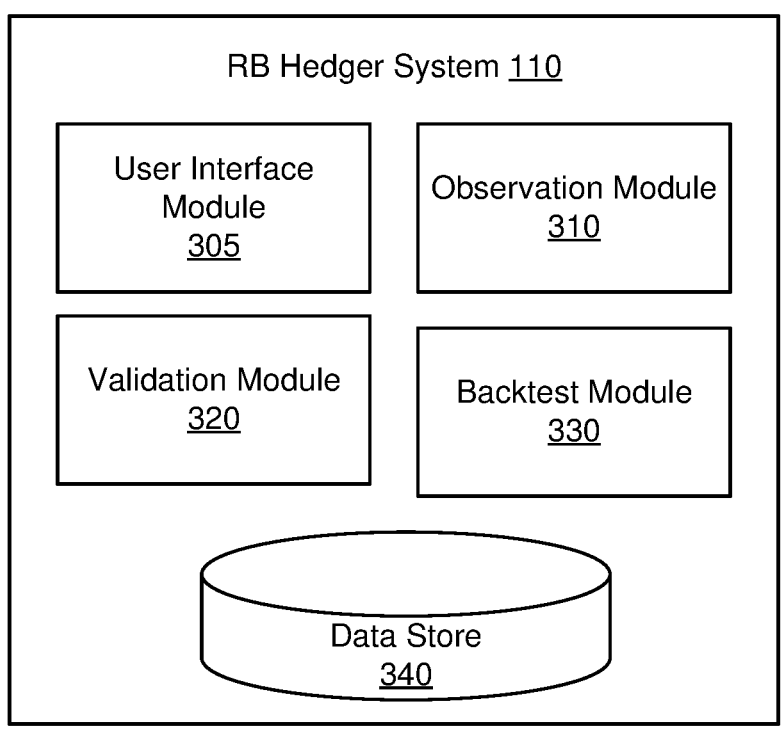
FIG. 3 is a block diagram of the RB hedger system shown in FIG. 1, according to one embodiment.

FIG. 3 illustrates one embodiment of the RB hedger system 110. In the embodiment shown, the RB hedger system 110 includes a user interface module 305, an observation module 310, a validation module 320, a backtest module 330, and a datastore 340. In other embodiments, the networked computing environment 100 includes different or additional elements. In addition, the functions may be distributed among the elements in a different manner than described.

The user interface module 305 provides a user interface for display to an end user (e.g., at a client device 140). In one embodiment, the user interface includes controls to enable the end user to select a target asset for which a hedge portfolio is desired and the values to use for hyperparameters (e.g., concentration and diversity). Additionally or alternatively, the user interface may include controls to enable the end user to select one or more of the observation, validation, or backtest periods to use. The user interface may also include one or more metrics indicating the performance of the calculated hedge portfolio relative to the target asset in the form of numerical values, charts, graphs, and the like. In other embodiments, some of the parameters may be hardcoded or determined from other parameters selected by the user. For example, the user interface may enable the end user to select the observation period 210 and the one-month period after the selected observation period 210 may be automatically selected as the validation period 220.

If the end user changes a hyperparameter (or defines a different observation, validation, or backtest period), the RB hedger system 110 may automatically determine an updated hedge portfolio and update one or more metrics displayed in the user interface to indicate the performance of the newly calculated hedge portfolio. Thus, end users can tweak the hyperparameters according to their needs or preferences and quickly see the results on the hedge portfolio. The user interface may also include controls to enable the end user to obtain the calculated hedge portfolio (e.g., by initiating trades for assets in an electronic trading system).

The observation module 310 fits the RB hedger model to the price of the target asset over the observation period 210. The observation module 310 returns a portfolio of assets that tracks the performance of the target asset as closely as possible.

The validation module 320 chooses values for the model hyperparameters based on the price of the target asset during the validation period 220. The hyperparameters are tunable model parameters that are tuned with the goal of optimizing the resulting hedge. In one embodiment, the hyperparameters optimize the resulting hedge in the sense that the selected values minimize holding error for the hedge.

The hyperparameters are tunable coefficients in the RB hedger that contribute to total model concentration and diversity. In one embodiment, the hyperparameters include lasso and ridge-like hyperparameters, as described previously. Since the RB hedger solves for buy-and-hold, the validation module 320 makes use of the holding error in the optimization problem as a measure of accuracy. The holding error is the standard deviation of the difference between the hedge and target returns over the specified time interval (i.e., different for observation, validation, and backtest periods) without hedge rebalancing. In contrast, a conventional weights-based hedger may assume constant rebalancing and this seeks to minimize the tracking error, which takes into account hedge rebalancing.

To minimize the holding error for the RB hedger, the validation module 320 considers a grid of possible combinations of lasso/ridge-like values using a grid search algorithm run in the validation period 220. The grid search chooses the optimal pair of hyperparameters (lasso/ridge-like values) that minimize the holding error during this period. The selected hyperparameters are then used to refit the linear model in the observation period 210 and used in the backtest period 230 to measure holding error. This approach optimizes the RB hedger for a holding period equal to the length of the validation period 220 (e.g., one month by default).

The backtest module 330 measures how closely the RB hedger is tracking the performance of the target asset over a date range after the observation/validation periods. This date range corresponds to the "simulated out-of-sample" period. The RB hedger is aiming to maximize performance in this period. In other words, the goal is for the hedger to track the target asset as closely as possible during this period since it simulates the period during which investors will actually hold the calculated hedge that the RB hedger outputs.

The datastore 340 includes one or more computer-readable media that store data and software used by the RB hedger system 110. For example, the parameterized model and data sets of the prices of the target asset and assets in the hedging portfolio may all be stored in the datastore. Although the datastore 340 is shown as a single entity within the RB hedger system 100, it may be divided into multiple parts, some or all of which may be accessed remotely (e.g., via the network 170).

Example Method

Figure 4:
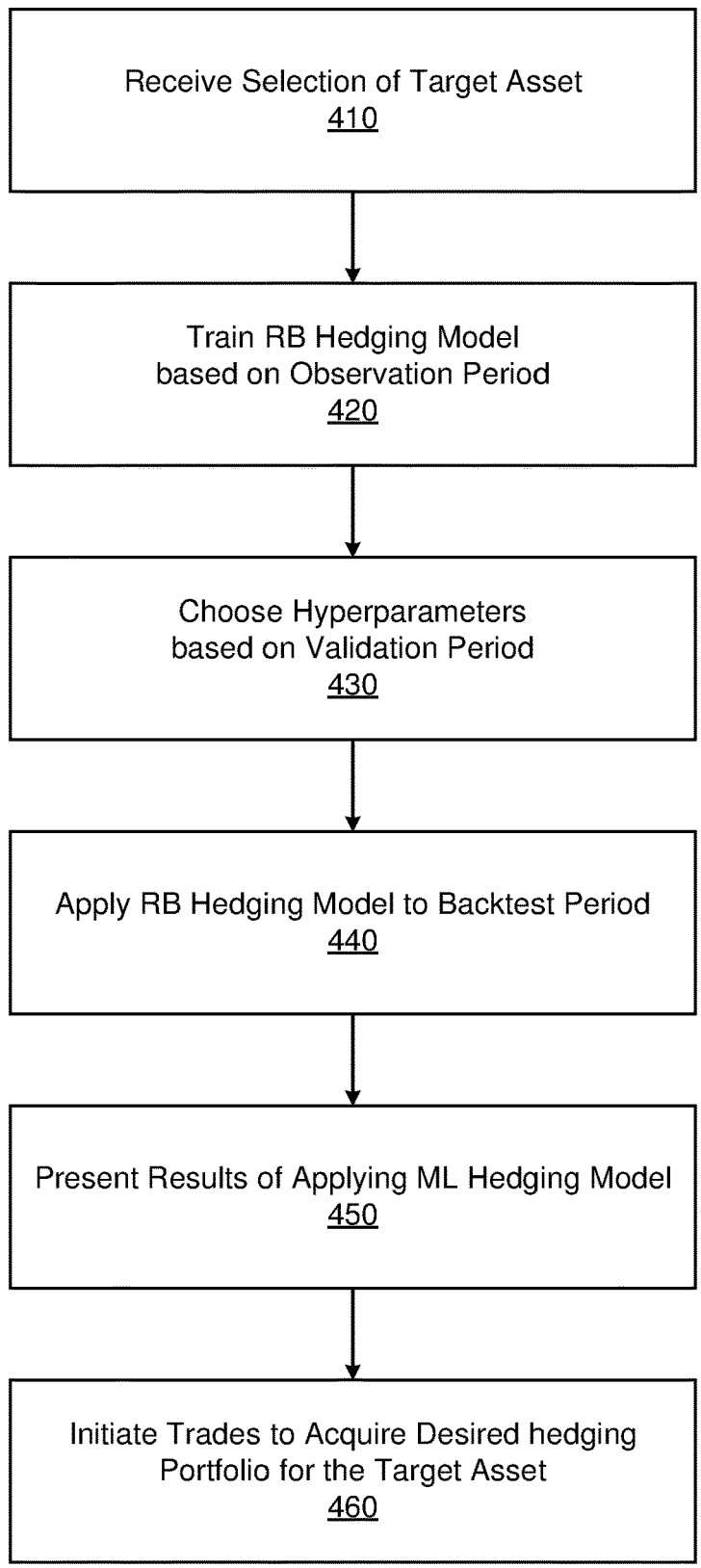
FIG. 4 is a flowchart of a method for using the RB hedging tool, according to one embodiment.

FIG. 4 illustrates a method 400 for using the RB hedger to identify a hedging portfolio for a target asset, according to one embodiment. The steps of FIG. 4 are illustrated from the perspective of the RB hedger system 110 performing the method 400. However, some or all of the steps may be performed by other entities or components. In addition, some embodiments may perform the steps in parallel, perform the steps in different orders, or perform different steps.

In the embodiment shown in FIG. 4, the method 400 begins with the RB hedger system 110 receiving 410 a selection of a target asset. For example, a user may select a desired target asset via a user interface displayed at a client device 140 and the selection may be sent to the RB hedger system 110 via a network 170. The system may also receive user selection of an observation period 210, a validation period 220, and a backtest period 230. Alternatively, default time ranges for one or more of these periods may be used.

The RB hedger system 110 trains 420 the RB hedging model based on price data for the target asset and potential hedging assets during the observation period 210. The RB hedger system 110 may choose 430 initial hyperparameters for the model based on price data for the assets during the validation period 220. In one embodiment, the initial hyperparameters are chosen 430 to minimize the holding error of the hedging portfolio. The RB hedger system 110 applies 440 the model to price data for the assets during the backtest period 230.

The RB hedger computes the optimal number of shares for each asset in the hedging portfolio and presents 450 the results to the user. In one embodiment, the results presented 450 to the user include the assets that makeup the hedging portfolio and one or more performance metrics, such as the holding error, tracking error, etc. One advantage of this approach it that the hedging portfolio is assumed to be held throughout the backtest period 230 (or for a substantial portion of it), without rebalancing it daily. This is in contrast to previous methods, which compute the optimal weights for each asset in the hedging portfolio, rather than the optimal number of shares. The disadvantage of these previous methods is that they provide a solution that can be realized only by regularly (e.g., daily) rebalancing the hedging portfolio daily, incurring additional transaction costs. As an example, say the hedge solution is 50% asset A and 50% asset B in the weights formulation. To maintain the weighting of 50% for each asset, the portfolio must be rebalanced daily (because asset A could increase in price and asset B could decrease in price, where you now have 51% asset A and 49% asset B in your portfolio). Whereas if the solution is 50 shares of A and 50 shares of B then you will still maintain 50 shares of each asset even if the prices increase or decrease.

Once the results have been presented 450 to the user, the user may modify one or more settings of the model (e.g., the values of one or more hyperparameters) via the user interface. When the RB hedging system 110 receives an updated setting, it retrains the model and presents 450 updated results to the user. For example, the model may be refitted to the observation and validation period using the updated settings and reapplied to the backtest period to generate one or more performance metrics for the retrained model. Thus, the user can explore how different choices (e.g., different values of the diversity and concentration hyperparameters) impact the makeup and performance of the calculated hedging portfolio.

The user interface may also include controls to enable the user to initiate 460 trades to acquire the hedging portfolio calculated by the RB hedging tool. For example, once the user has experimented with different settings and a hedging portfolio that meets the user's needs and preferences is displayed in the user interface, the user may select a button or other control to automatically place trades with an electronic trading system to obtain the currently displayed hedging portfolio.

Example Use Case

Figure 5A:
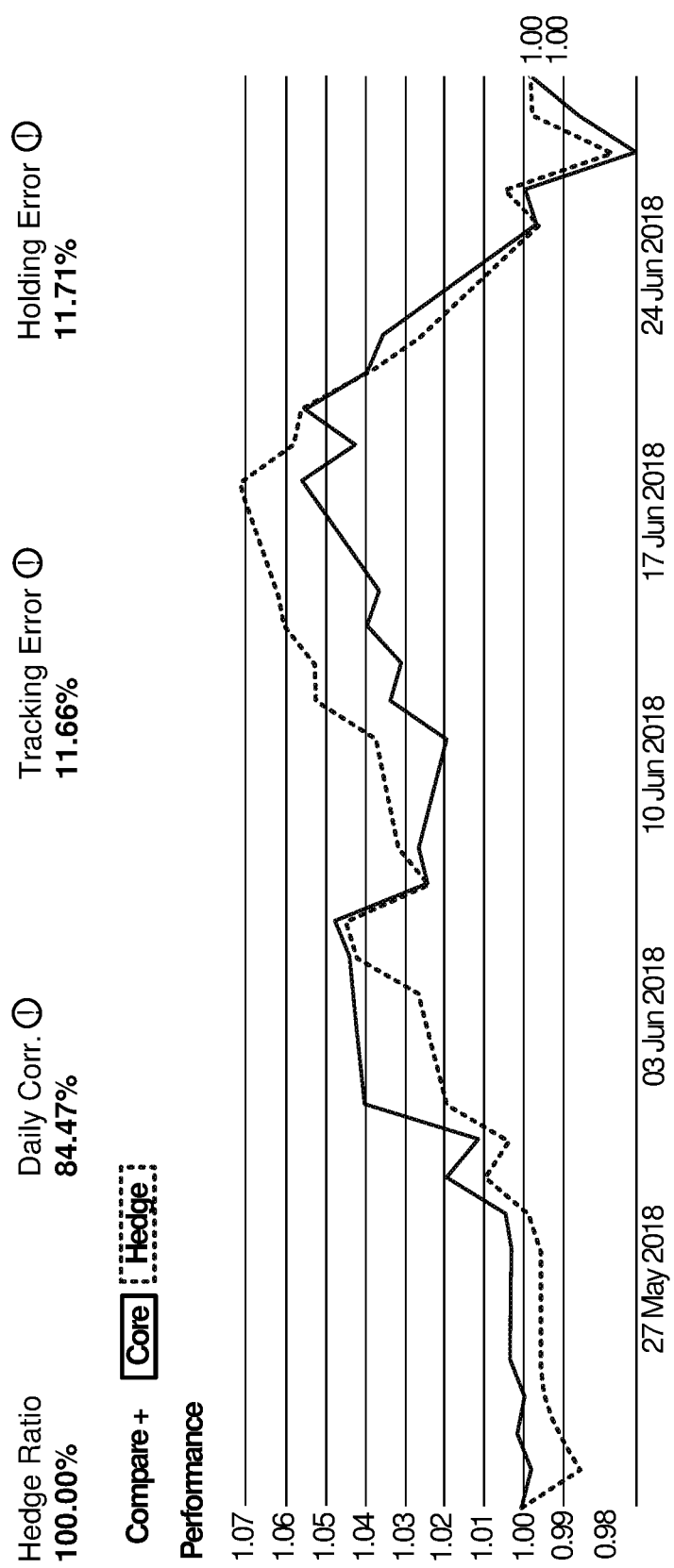
FIGS. 5A and 5B compare the performance of the RB hedging tool with a conventional hedging tool, according to one embodiment.

FIG. 5A illustrates the performance of a conventional hedging tool. FIG. 5A includes a pair of performance curves (in terms of percent change in asset returns) for the conventional hedger applied to a target asset in a backtest period 230 (between May 21, 2018 and Jun. 29, 2018). The hedge line is tracking the core (target asset) line, attempting to minimize the tracking error.

Figure 5B:
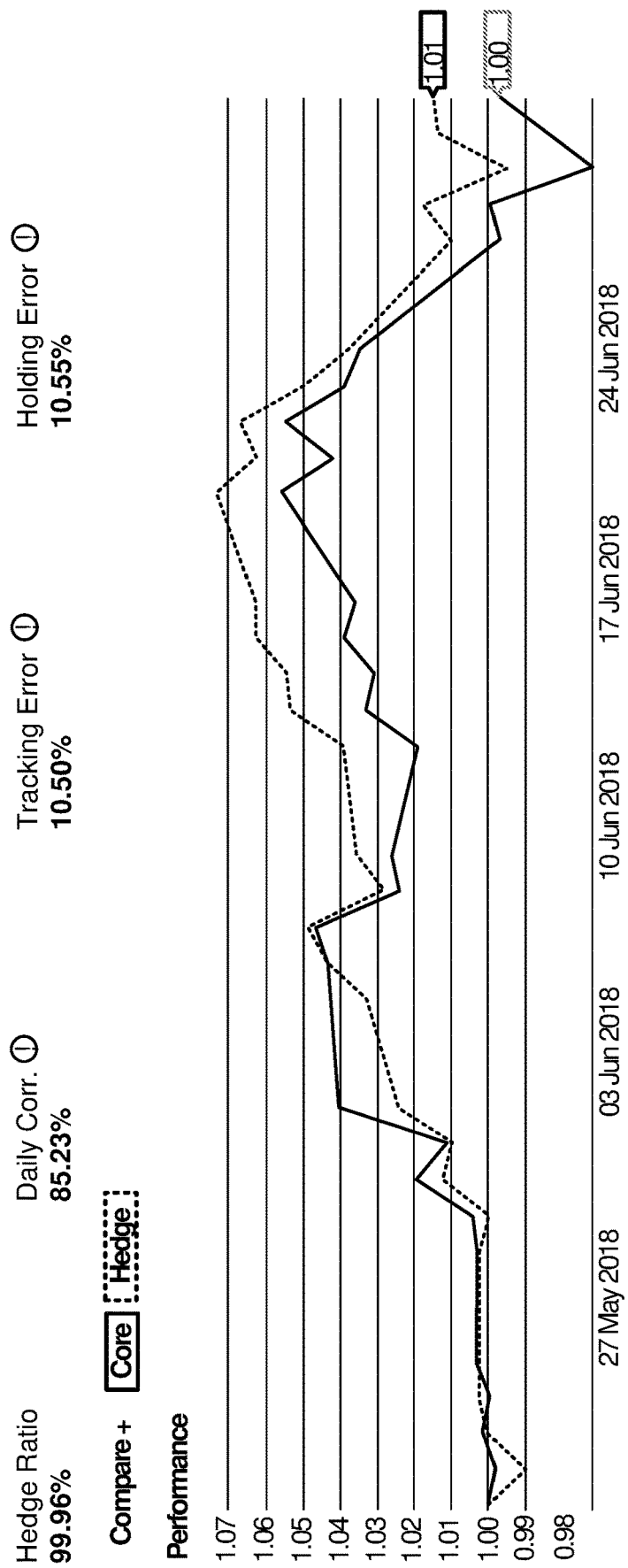

FIG. 5B illustrates the performance of one embodiment of the RB hedger. FIG. 5B includes a pair of performance curves (in terms of percent change in asset returns) for the RB hedger applied to the target asset in the backtest period 230 (between May 21, 2018 and Jun. 29, 2018). The hedge line is tracking the core (target asset) line, attempting to minimize the holding error. Note that the tracking and holding errors in the backtest period 230 are both lower for the RB hedger compared with the conventional hedger.

Figure 6:
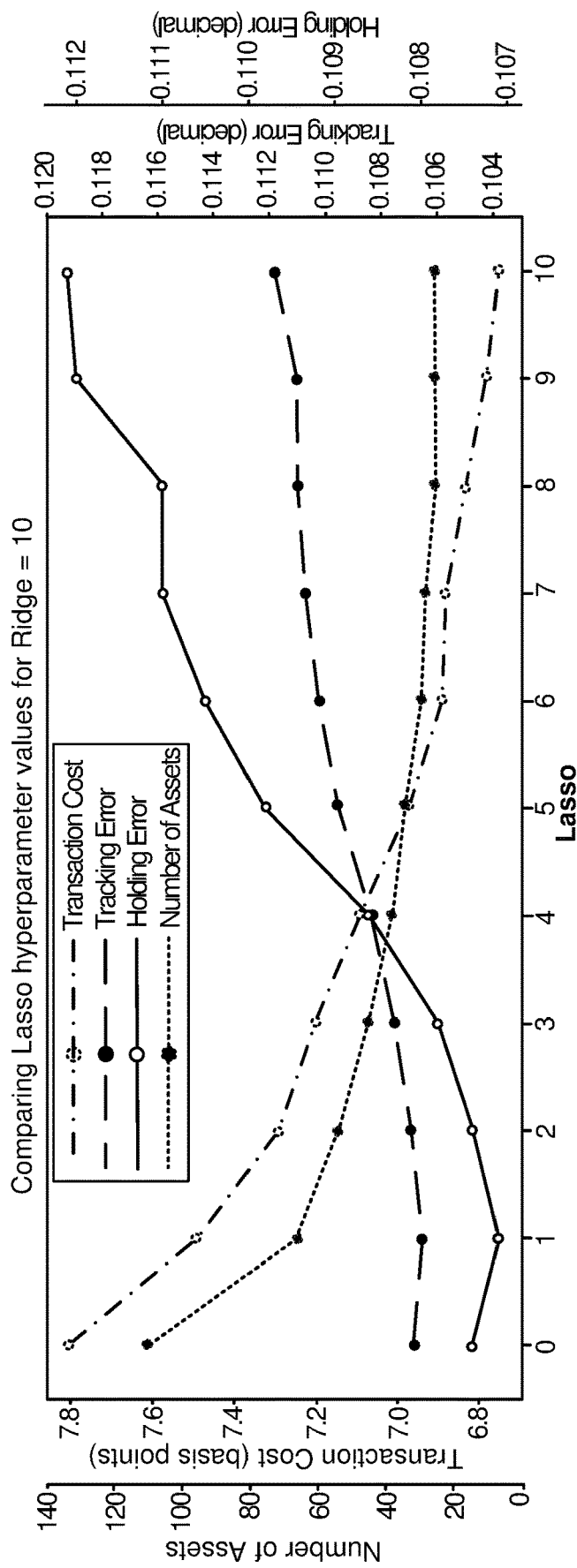
FIG. 6 illustrates the impact of the lasso hyperparameter on various metrics, according to one embodiment.

FIG. 6 illustrates the impact of the lasso hyperparameter on various metrics, according to one embodiment. The metrics include transaction cost, tracking error, holding error, and number of assets generated for the target asset in the backtest period 230. This illustrates the tradeoffs that a user can choose between when toggling different hyperparameter values on the user interface for the RB hedger. In this case, the ridge-like hyperparameter is fixed at ten to illustrate the changes in metrics that occur as tee lasso hyperparameter varies from zero to ten. However, a user can choose to modify both of these hyperparameters to fit their needs.

Figure 7B:
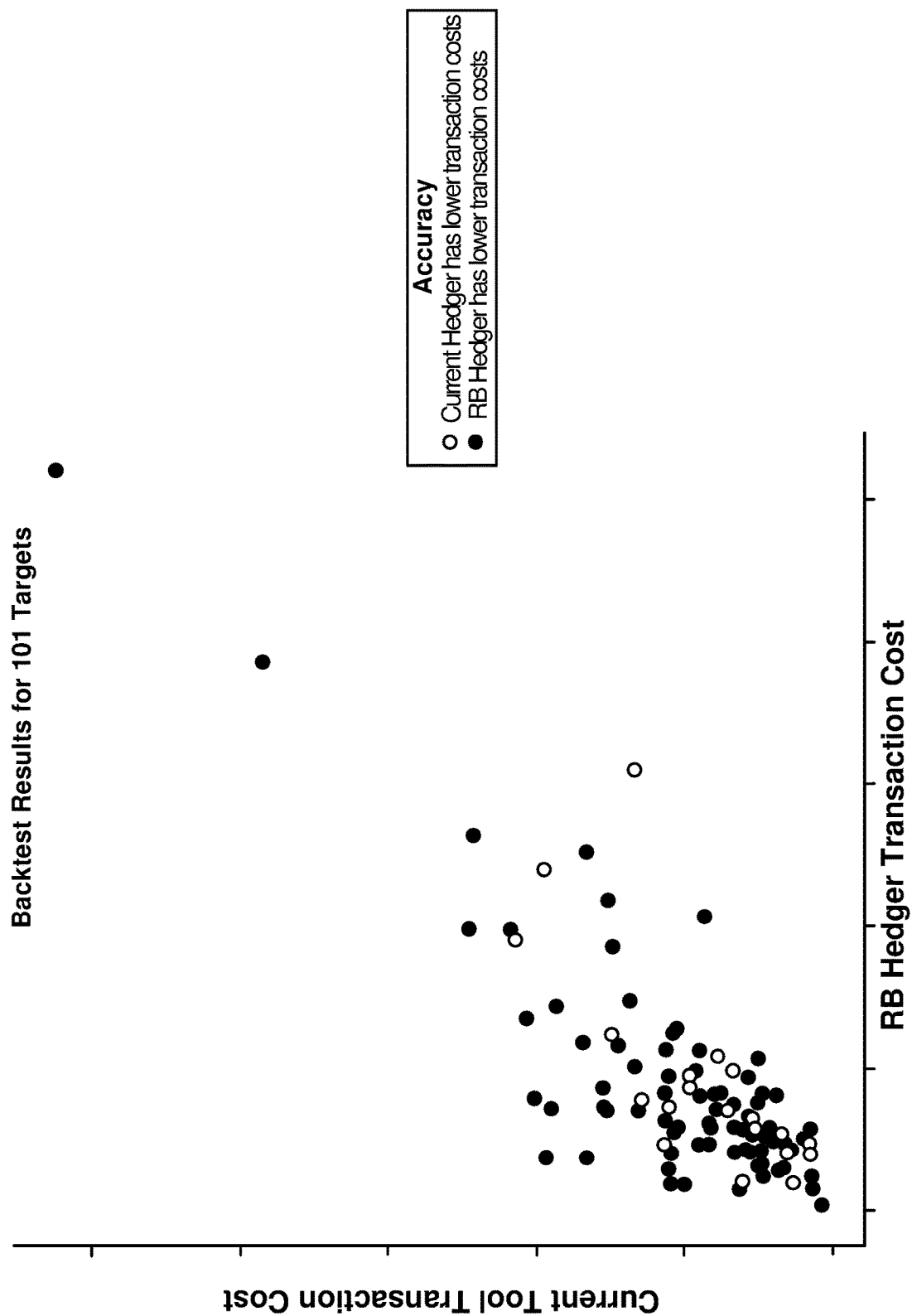

FIGS. 7A and 7B illustrate the performance of one embodiment of the RB hedger relative to a conventional hedger. The RB hedger was backtested in various ways to validate its performance. The results indicate that the RB hedger increases the accuracy of the conventional hedger, especially for hedges computed over larger universes of assets. The backtests were run on a representative set of hedges similar to real hedges. For each of these hedges, the accuracy of a simple linear regression was compared to the accuracy of the RB hedger the month following the calculation (i.e. during the backtest period 230).

The results are for a sample of 101 hedges (101 unique targets, random choice of notional, observation period 210, maximum return deviation, maximum daily volume, and using assets from the Russell 3000 index to construct the hedge). FIG. 7A compares the holding error of the hedges generated by the RB hedger and the corresponding hedges generated by the conventional hedger. The RB hedger had lower holding error for most of these random hedges. FIG. 7B compares the transaction costs for the hedges generated by the RB hedger and the corresponding hedges generated by the conventional hedger. The transaction cost used in this case is the weighted average estimated cost of trading the positions in the hedge with Goldman Sachs. The RB hedger had lower transaction costs for most of these random hedges.

Figure 8A:
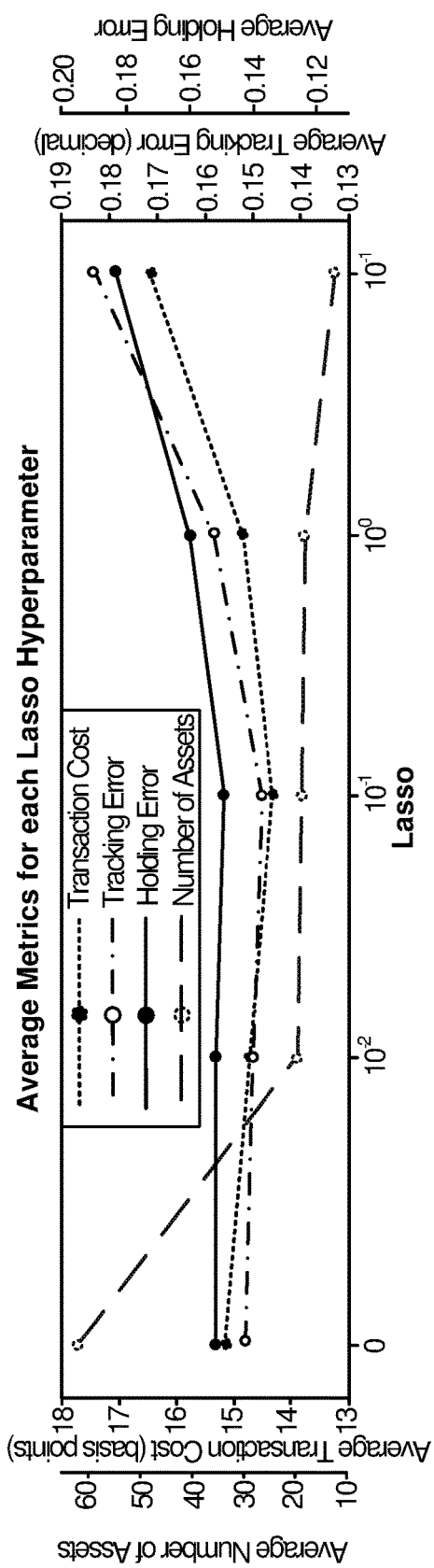
FIGS. 8A through 8C illustrate the impact of the lasso and ridge-like hyper parameters on various metrics, according to one embodiment.
Figure 8B:
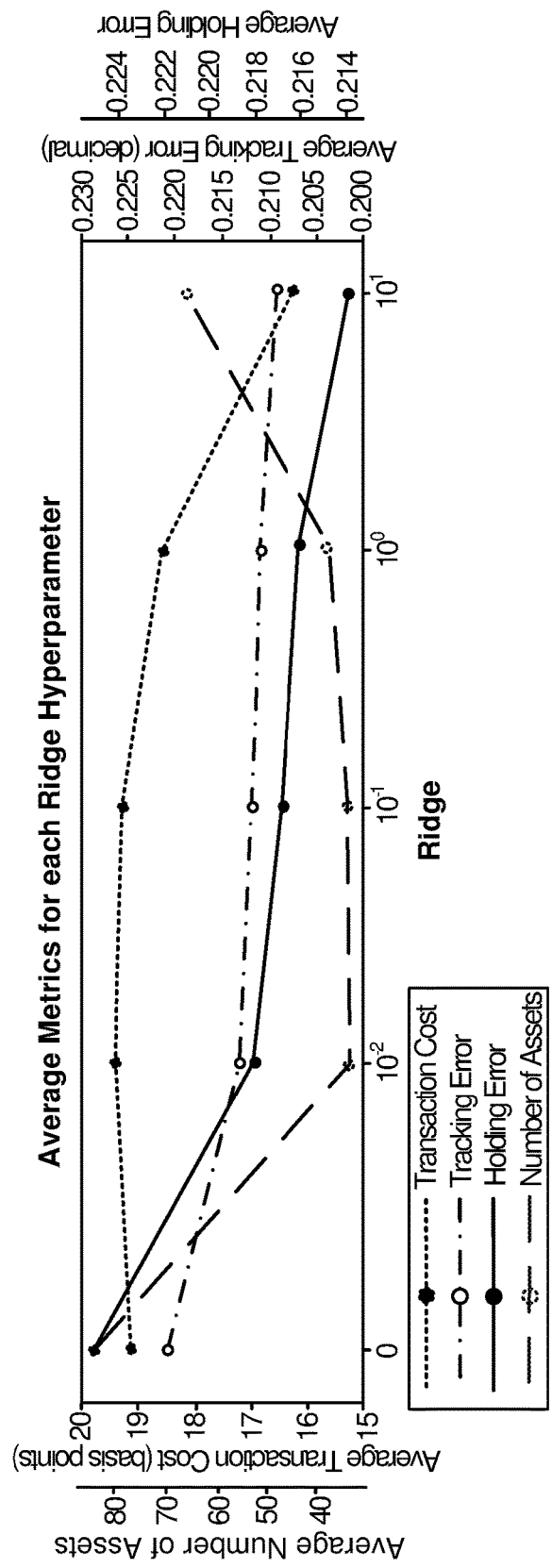
Figure 8C:
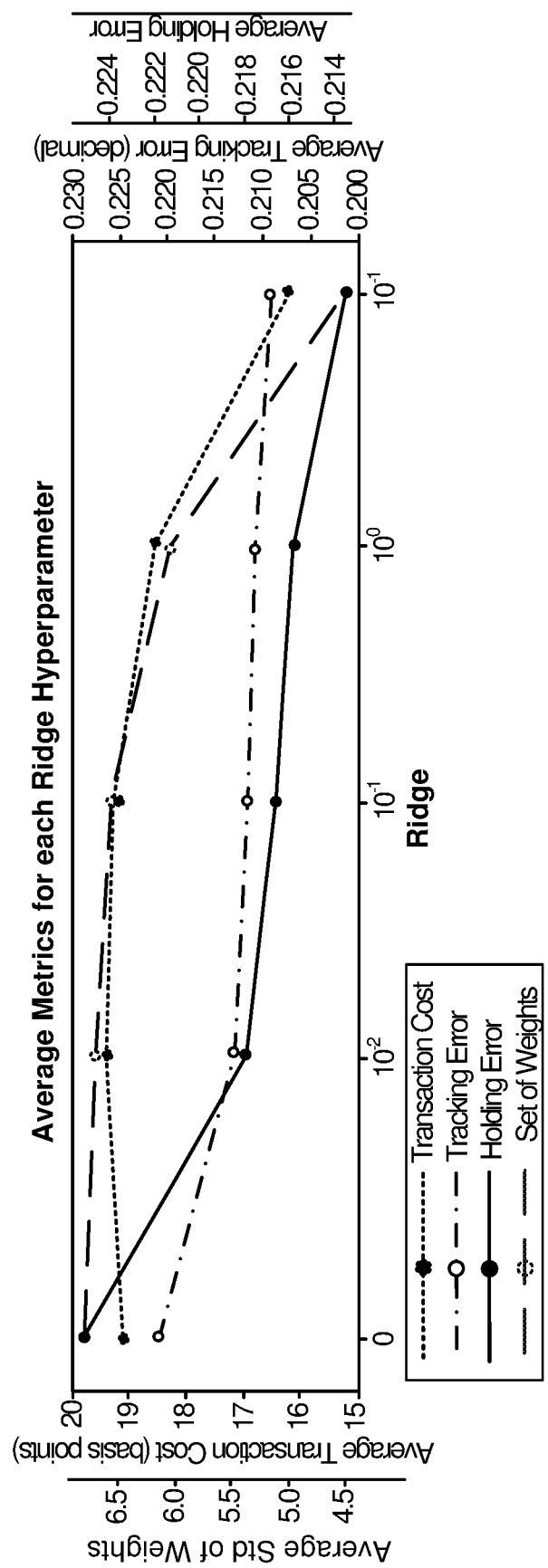

FIGS. 8A through 8C illustrate the impact of the lasso and ridge-like hyperparameters on various metrics for one embodiment of the RB hedger. The RB hedger was backtested for 150 random target assets to compare how various metrics vary the values of the lasso and ridge-like hyperparameters are changed. These metrics include: transaction cost, tracking error, holding error, number of assets in hedge portfolio, and standard deviation of weights of the assets in the hedge portfolio. The results were analyzed by considering a range of hyperparameter values, then averaged out each metric and plotting the averages. These plots give an indication of the behavior of the fitted hedges as the hyperparameters are varied.

In particular, FIGS. 8A through 8C illustrate average metrics generated from 782 hedges (150 unique targets, random choice of notional, observation period 210, maximum return deviation, maximum daily volume, and a random choice of universe between S&P500, Russell 3000 or Nasdaq 100). The average value for each metric is computed based on all of the hedges grouped by the ridge-like hyperparameter used in that hedge.

FIG. 8A illustrates average transaction cost, tracking error, holding error, and number of assets for variations in the lasso hyperparameter. The ridge-like hyperparameter is fixed to be zero. FIG. 8B illustrates average transaction cost, tracking error, holding error, and number of assets for variations in the ridge-like hyperparameter. The lasso hyperparameter is fixed to be zero. FIG. 8C illustrates average transaction cost, tracking error, holding error, and standard deviation of weights for variations in the ridge-like hyperparameter. The lasso hyperparameter is fixed to be zero. These plots indicate how the hyperparameters may be adjusted to achieve different objectives. For example, a low holding error may be obtained using high ridge-like values and low lasso values, but this will also increase the number of assets in the hedging portfolio, which may be undesirable.

Example User Interface

Figure 9:
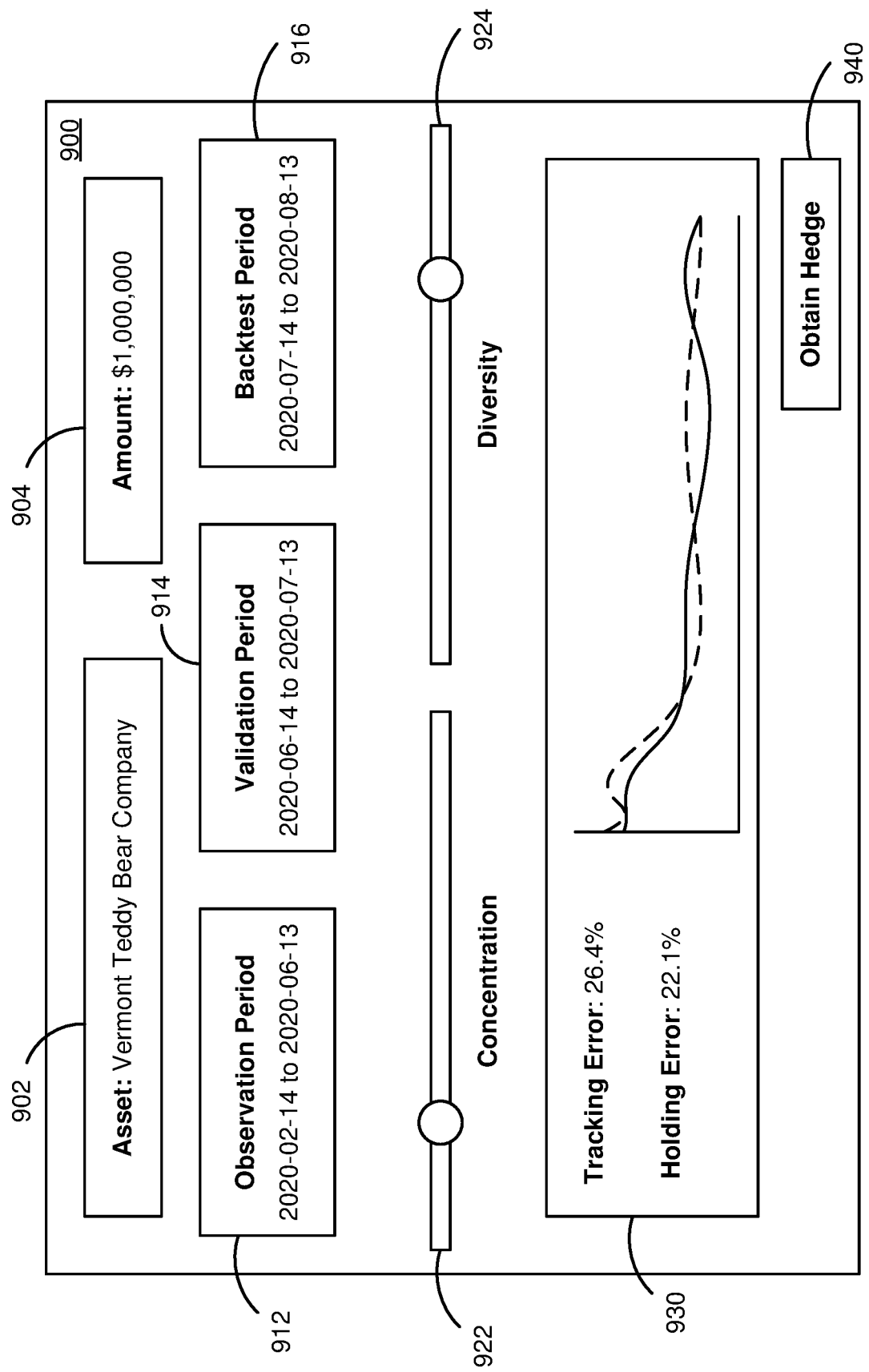
FIG. 9 illustrate an example user interface for the RB hedging tool, according to one embodiment.

FIG. 9 illustrates an example user interface 900 for the RB hedging tool, according to one embodiment. In the embodiment shown, the user interface 900 includes a target asset box 902, an amount box 904, an observation period box 912, a validation period box 914, a backtest period box 916, a concentration slider 922, a diversity slider 924, a metrics display area 930, and an obtain hedge button 940. The depicted user interface 900 is simplified to illustrate various aspects of the RB hedger tool. In other embodiments, the user interface 900 may include different or additional elements.

The target asset box 902 identifies the currently selected target asset. The user may click on or otherwise select the target asset box 902 and choose a different target asset. For example, the user may type the name of an asset, selecting an asset from a drop-down list of available assets, or provide a stock ticker for an asset, etc.

The amount box 904 indicates the amount of the target asset to be hedged by the hedging portfolio. In FIG. 9, the amount is indicated as a dollar value. However, the amount may be indicated in other ways, such as values in different currencies or a number of instances of the asset (e.g., a number of shares).

The observation period box 912, validation period box 914, and backtest period box 916 display the currently selected observation period, validation period, and backtest period, respectively. The user may select these boxes to modify the corresponding period. The user may define a period in any appropriate way, such as typing a beginning and end date or selecting a range of dates from a popup calendar. In some embodiments, one or more of the periods may be determined automatically and not editable by the user. For example, default periods such as the preceding month for the backtest period, the month before that for the validation period, and the four months before that for the observation period may be used. As another example, the user may select one period (e.g., the observation period) and the other periods may be automatically determined based on the user's selection (e.g., the validation period may always be a one-month period immediately after the observation period).

The concentration slider 922 and the diversity slider 924 enable the user to modify the values of the concentration and diversity hyperparameters, respectively. It should be appreciated that other types of control may be used to modify the hyperparameters. It should also be appreciated that controls for modifying other hyperparameters may be included in the user interface 900, depending on the underlying model being used by the RB hedger.

The metrics display area 930 includes information about the hedging portfolio generated by the RB hedger using the values provided elsewhere in the user interface 900. In one embodiment, the metrics display area 930 displays values for one or more metrics indicating the performance of the generated hedging portfolio relative to the target asset during the backtest period. The metrics may include the tracking error, the holding error, the daily correlation, the hedge transaction costs, the annual volatility, charts indicating the relative prices of the hedging portfolio and the target asset, and the like. If the user updates any settings of the RB hedger (e.g., by changing the value of one of the hyperparameters), the hedging portfolio is recalculated and the metrics displayed in the metrics display area 930 may be updated automatically.

When the metrics displayed in the metrics display area 930 meet the user's needs and preferences, the user may select (e.g., click on) the obtain hedge button 940 to obtain the hedging portfolio generated by the RB hedger using the current settings. In one embodiment, the RB hedger system 110 automatically initiates trades with an electronic trading system to obtain the assets in the hedging portfolio for the user. Alternatively, selecting the obtain hedge button 940 may display a list of assets in the hedging portfolio and open a trading interface with which the user can place orders to obtain the assets in the hedging portfolio.

Computing System Architecture

Figure 10:
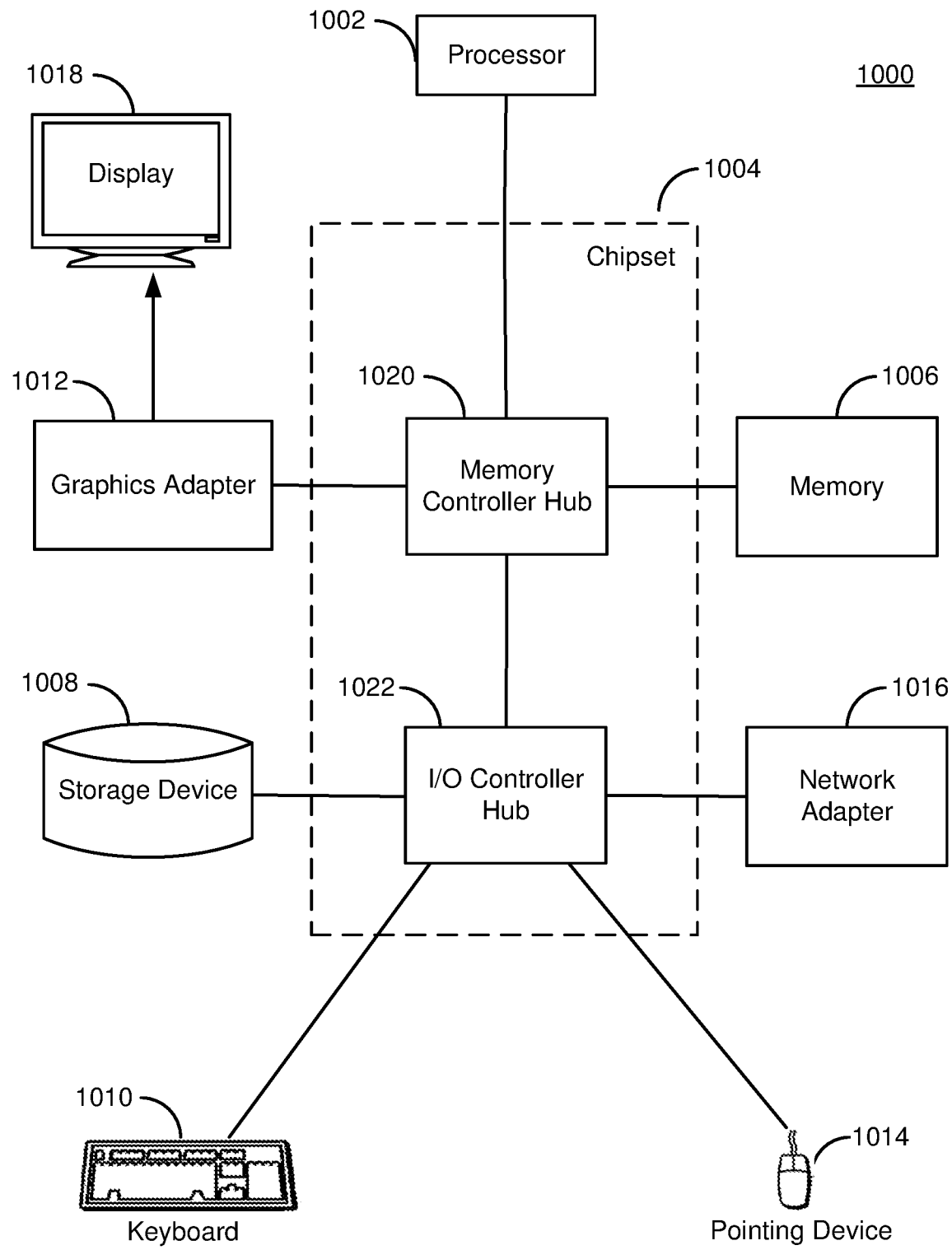
FIG. 10 is a block diagram illustrating an example of a computer suitable for use in the networked computing environment of FIG. 1, according to one embodiment.

FIG. 10 illustrates an example computer 1000 suitable for use as the RB hedger system 110 or a client device 140. The example computer 1000 includes at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 1020, and a display 1018 is coupled to the graphics adapter 1012. A storage device 1008, keyboard 1010, pointing device 1014, and network adapter 1016 are coupled to the I/O controller hub 1022. Other embodiments of the computer 1000 have different architectures.

In the embodiment shown in FIG. 10, the storage device 1008 is a non-transitory computer-readable storage medium such as a hard drive, compact disk read-only memory (CD-ROM), DVD, or a solid-state memory device. The memory 1006 holds instructions and data used by the processor 1002. The pointing device 1014 is a mouse, track ball, touch-screen, or other type of pointing device, and is used in combination with the keyboard 1010 (which may be an on-screen keyboard) to input data into the computer system 1000. The graphics adapter 1012 displays images and other information on the display 1018. The network adapter 1016 couples the computer system 1000 to one or more computer networks (e.g., network 170). The types of computers used by the entities of FIGS. 1 and 3 can vary depending upon the embodiment and the processing power required by the entity. Furthermore, the computers can lack some of the components described above, such as keyboards 1010, graphics adapters 1012, and displays 1018.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for simulating the performance of a hedging portfolio. Thus, while particular embodiments and applications have been illustrated and described, it is to be understood that the described subject matter is not limited to the precise construction and components disclosed. The scope of protection should be limited only by any claims that may ultimately issue.

What is claimed is:

1. A method for training and using a regularization-based model to build a hedging portfolio, the method comprising:
   identifying, using a processor, a target asset;
   applying, using the processor, the regularization-based model to identify a recommended portfolio of assets that track the target asset, wherein applying the regularization-based model includes:
   training the regularization-based model using asset price data from an observation period;
   choosing initial hyperparameters of the regularization-based model using asset price data from a validation period, the validation period being after the observation period;

identifying an initial portfolio of assets by applying the regularization-based model to asset price data from a backtest period, the backtest period being after the validation period;

providing for display in a user interface information regarding the initial portfolio of assets;

receiving, via the user interface, an end-user modification to one or more hyperparameters of the regularization-based model to obtain updated hyperparameters;

retraining the regularization-based model using the updated hyperparameters as modified by the end-user;

identifying an updated portfolio of assets by applying the retrained regularization-based model to the asset price data from the backtest period, wherein the updated portfolio of assets is the recommended portfolio of assets; and providing for display in the user interface updated information regarding the recommended portfolio of assets; and obtaining, using the processor, the recommended portfolio of assets.

2. The method of claim 1, wherein the hyperparameters include a concentration hyperparameter that impacts a total number of assets in the recommended portfolio of assets.

3. The method of claim 1, wherein the hyperparameters include a diversity hyperparameter that impacts a range of relative sizes of asset positions in the recommended portfolio of assets.

4. The method of claim 1, wherein the regularization-based model uses a linear objective function.

5. The method of claim 4, wherein the linear objective function is solved according to a combination of linear and quadratic constraints.

6. The method of claim 1, wherein the information regarding the portfolio of assets includes one or more metrics representing a performance of the initial portfolio and the user interface includes controls configured to enable the end-user to provide the modification to the one or more hyperparameters of the regularization-based model.

7. The method of claim 6, wherein the updated information includes one or more updated metrics representing a performance of the updated portfolio.

8. The method of claim 6, wherein the one or more metrics include at least one of: a tracking error, a holding error, a daily correlation, a hedge transaction cost, an annual volatility, or a chart indicating relative prices of the initial portfolio and the target asset.

9. The method of claim 6, wherein the user interface includes one or more asset-selection controls configured to enable the end-user to select the target asset, and wherein identifying the target asset includes receiving an identifier of the target asset from the client device in response to end-user input using the one or more asset-selection controls.

10. The method of claim 1, wherein retraining the regularization-based model is done in real time.

11. A non-transitory computer-readable medium storing instructions for training and using a regularization-based model to build a hedging portfolio that, when executed by a computing device, cause the computing device to perform operations comprising:

identifying a target asset;

applying the regularization-based model to identify a recommended portfolio of assets that track the target asset, wherein applying the regularization-based model includes:

training the regularization-based model using asset price data from an observation period;

choosing initial hyperparameters of the regularization-based model using asset price data from a validation period, the validation period being after the observation period;

identifying an initial portfolio of assets by applying the regularization-based model to asset price data from a backtest period, the backtest period being after the validation period;

providing for display in a user interface information regarding the initial portfolio of assets;

receiving, via the user interface, an end-user modification to one or more hyperparameters of the regularization-based model to obtain updated hyperparameters;

retraining the regularization-based model using the setting updated hyperparameters as modified by the end-user;

identifying an updated portfolio of assets by applying the retrained regularization-based model to the asset price data from the backtest period, wherein the updated portfolio of assets is the recommended portfolio of assets; and providing for display in the user interface updated information regarding the recommended portfolio of assets; and obtaining the recommended portfolio of assets.

12. The non-transitory computer-readable medium of claim 11, wherein the hyperparameters include a concentration hyperparameter that impacts a total number of assets in the recommended portfolio of assets.

13. The non-transitory computer-readable medium of claim 11, wherein the hyperparameters include a diversity hyperparameter that impacts a range of relative sizes of asset positions in the recommended portfolio of assets.

14. The non-transitory computer-readable medium of claim 11, wherein the regularization-based model uses a linear objective function.

15. The non-transitory computer-readable medium of claim 14, wherein the linear objective function is solved according to a combination of linear and quadratic constraints.

16. The non-transitory computer-readable medium of claim 11, wherein the information regarding the portfolio of assets includes one or more metrics representing a performance of the initial portfolio and the user interface includes controls configured to enable the end-user to provide the modification to a setting of the regularization-based model.

17. The non-transitory computer-readable medium of claim 16, wherein the updated information includes one or more updated metrics representing a performance of the updated portfolio.

18. The non-transitory computer-readable medium of claim 16, wherein the one or more metrics include at least one of: a tracking error, a holding error, a daily correlation, a hedge transaction cost, an annual volatility, or a chart indicating relative prices of the initial portfolio and the target asset.

19. The non-transitory computer-readable medium of claim 11, wherein the user interface includes one or more asset-selection controls configured to enable the end-user to select the target asset, and wherein identifying the target asset includes receiving an identifier of the target asset from the client device in response to end-user input using the one or more asset-selection controls.

20. The non-transitory computer-readable medium of claim 11, wherein retraining the regularization-based model is done in real time.

* * * * *

UNITED STATES PATENT AND TRADEMARK OFFICE
CERTIFICATE OF CORRECTION

| | |
|---|---|
| PATENT NO. | : 11,593,885 B2 |
| APPLICATION NO. | : 17/193949 |
| DATED | : February 28, 2023 |
| INVENTOR(S) | : Elkan et al. |

It is certified that error appears in the above-identified patent and that said Letters Patent is hereby corrected as shown below:

On the Title Page

Item (57), in Column 2, under "Abstract", Line 3, delete "one or" and insert -- one or more --, therefor.

In the Claims

In Column 14, in Claim 11, Line 17, delete "setting updated" and insert -- updated --, therefor.

Signed and Sealed this
Sixth Day of June, 2023

Katherine Kelly Vidal
*Director of the United States Patent and Trademark Office*